(12) United States Patent
Yamamoto et al.

(10) Patent No.: US 7,764,419 B2
(45) Date of Patent: Jul. 27, 2010

(54) PRESERVATION METHOD OF MICROCAPSULES FOR ELECTROPHORETIC DISPLAY DEVICES AND ITS APPLICATIONS

(75) Inventors: Hitoshi Yamamoto, Chino (JP);
Harunobu Komatsu, Matsumoto (JP);
Mitsuo Kushino, Inagawa-cho (JP);
Tomoyuki Kuwamoto, Nara (JP)

(73) Assignees: Seiko Epson Corporation, Tokyo (JP);
Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/068,923

(22) Filed: Feb. 13, 2008

(65) Prior Publication Data

US 2008/0192330 A1    Aug. 14, 2008

(30) Foreign Application Priority Data

Feb. 13, 2007    (JP) ............................. 2007-032483

(51) Int. Cl.
*G02B 26/00* (2006.01)
(52) U.S. Cl. ...................................... 359/296
(58) Field of Classification Search .................. 359/296
See application file for complete search history.

(56) References Cited

U.S. PATENT DOCUMENTS

| | | | | |
|---|---|---|---|---|
| 7,387,856 B2* | 6/2008 | Chari et al. | .................... | 430/20 |
| 2004/0012106 A1 | 1/2004 | Kanbe et al. | | |
| 2007/0009739 A1 | 1/2007 | Kanbe et al. | | |
| 2007/0268566 A1* | 11/2007 | Yang et al. | .................. | 359/296 |
| 2007/0297038 A1* | 12/2007 | Chopra et al. | ................ | 359/296 |
| 2008/0117498 A1* | 5/2008 | Yang et al. | .................... | 359/296 |
| 2008/0174853 A1* | 7/2008 | Danner et al. | ................ | 359/296 |

FOREIGN PATENT DOCUMENTS

| | | |
|---|---|---|
| BA | 2004-102235 | 4/2004 |
| JP | 50-15115 | 6/1975 |
| JP | 62-291568 | 12/1987 |
| JP | 2551783 | 8/1996 |

OTHER PUBLICATIONS

English translation of Notice of Reasons for Rejection dated Nov. 25, 2008 issued in connection with Japanese Application No. 2007-032483 corresponding to the present U.S. application.
Decision of Rejection issued Oct. 20, 2009 in Japanese priority application no. JP2007-032483, with partial English translation.
Notice of Reasons for Rejection issued Mar. 9, 2010 in corresponding Japanese Application No. 2007-032483, with English translation.

* cited by examiner

*Primary Examiner*—Evelyn A. Lester
(74) *Attorney, Agent, or Firm*—Wenderoth, Lind & Ponack, L.L.P.

(57) ABSTRACT

The preservation method of microcapsules for electrophoretic display devices according to the present invention includes preserving microcapsules for electrophoretic display devices in a water-based medium having an electric conductivity of 500 μS/cm or lower. The preservation under such conditions makes it possible to preserve microcapsules for electrophoretic display devices over a long period of time without deteriorating their electrophoretic properties. The microcapsules for electrophoretic display devices, which have been preserved by the preservation method of the present invention, can be used, as its applications, for sheets for electrophoretic display devices and electrophoretic display devices using the sheets.

7 Claims, 3 Drawing Sheets

PRESERVATION METHOD OF MICROCAPSULES FOR ELECTROPHORETIC DISPLAY DEVICES AND ITS APPLICATIONS

BACKGROUND OF THE INVENTION

1. Field of the invention

The present invention relates to a preservation method of microcapsules for electrophoretic display devices and its applications.

2. Description of the Related Art

An electrophoretic display device displays character data, image data, and the like, by the behavior of electrophoretic particles, for example, when a voltage is applied to a dispersion in which the electrophoretic particles are dispersed in a solvent. For example, if the electrophoretic particles and the solvent are colored with different colors, the color of the electrophoretic particles is observed when the electrophoretic particles are moved to the surface of the solvent by voltage application, and the color of the dispersion is observed when the electrophoretic particles are moved to the bottom of the solvent. If electrodes to which voltage application is made possible by address appointment are provided, different colors for the respective addresses can be displayed, and accordingly, arbitrary character data and image data can be displayed. Moreover, it is possible to rewrite the display data, and at the same time, it is advantageous that the display data can be maintained as it is, even if there is no electric signal.

In recent years, in place of the conventional electrophoretic display devices (e.g., see Japanese Patent Publication No. 50-15115) in which a dispersion of electrophoretic particles are enclosed in spaces between opposed electrode substrates, there have been developed microcapsule type electrophoretic display devices (e.g., see Japanese Patent No. 2551783) with a structure in which microcapsules enclosing a dispersion of electrophoretic particles are arranged between opposed electrode substrates. As compared with the conventional electrophoretic display devices, the microcapsule type electrophoretic display devices are remarkably improved in various performances and functions, such as long-term stability of display, responsiveness, contrast, and display rewritable times.

Electronic equipments using electrophoretic display devices have various sizes, and correspondingly, the electrophoretic display devices also have various sizes. Further, there are many types of substrates needed to undergo the application of microcapsules for electrophoretic display devices. Therefore, it is not a good idea that microcapsules for electrophoretic display devices are preserved in the form of a sheet obtained by applying the microcapsules to a substrate. Accordingly, with respect to the preservation form of microcapsules for electrophoretic display devices, it is desirable to perverse the microcapsules for electrophoretic display devices in the stage before the microcapsules are made into a sheet in terms of utmost avoidance of vainness, efficient productivity, and advantageous resource utilization.

From the above-described viewpoints, when preserving microcapsules for electrophoretic display devices, it is supposed to be possible to preserve the microcapsules for electrophoretic display devices in the form of a synthesized dispersion obtained at the time of preparing the microcapsules for electrophoretic display devices, in the form of a paste obtained by filtering a dispersion of the microcapsules for electrophoretic display devices, or in the form of a coating solution obtained by making the microcapsules for electrophoretic display devices into a coating material.

Conventionally, as a preservation method of microcapsules, which are not microcapsules for electrophoretic display devices but contain an enclosing member, for example, Japanese Patent Laid-Open Publication No. 62-291568 discloses preserving the microcapsules in a preservation solution having an osmotic pressure higher than of the enclosing member by from 3% to 50% and reports that preservation stability is improved no less than 5 times as much as that when preserving the microcapsules in an isotonic solution. However, such a method can be applied only in the case where the enclosing member is a hydrophilic substance, and just like microcapsules for electrophoretic display devices, in the case where a dispersion containing electrophoretic particles dispersed in a hydrophobic organic solvent is enclosed, the above method cannot be employed.

SUMMARY OF THE INVENTION

The present inventors have made keen studies on a preservation method of microcapsules for electrophoretic display devices, and they have found that, in general, if microcapsules for electrophoretic display devices are preserved over a long period of time, their electrophoretic properties, particularly contrast, are apparently decreased. Moreover, the deterioration of their electrophoretic properties is most significant in the case where the microcapsules for electrophoretic display devices are preserved in the form of a coating solution obtained by making the microcapsules for electrophoretic display devices into a coating material. Further, not so much as compared with that when preserving in the form of a coating solution, it is confirmed that contrast is also decreased when the microcapsules for electrophoretic display devices are preserved in the form of a synthesized dispersion obtained at the time of preparing the microcapsules for electrophoretic display devices. Further, if microcapsules for electrophoretic display devices are preserved in the form of a paste obtained by filtering a dispersion of the microcapsules, the microcapsules for electrophoretic display devices are aggregated with one another and cannot be dispersed to form a mono-dispersion system but form bulky substances remaining in an aggregated state at the time of producing a coating material, and it may result in the impossibility of obtaining an excellent sheet by applying microcapsules for electrophoretic display devices to a substrate.

When microcapsules for electrophoretic display devices are preserved in the form of a sheet obtained by applying the microcapsules to a substrate, for example, a transparent electrically conductive film, it is confirmed that an organic solvent contained in the microcapsules for electrophoretic display devices is evaporated or bleeds, and due to that, their electrophoretic properties may be deteriorated in some cases.

Under the above-described circumstances, it is an object of the present invention to provide a method for preserving microcapsules for electrophoretic display devices over a long period of time without deteriorating their electrophoretic properties, and its applications.

The present inventors have made various studies, and as a result, they have found that if microcapsules for electrophoretic display devices are preserved in a water-based medium having an electric conductivity of 500 µS/cm or lower, the microcapsules can be preserved over a long period of time without deteriorating their electrophoretic properties, thereby completing the present invention.

Thus, the present invention provides a preservation method of microcapsules for electrophoretic display devices, comprising preserving microcapsules for electrophoretic display devices in a water-based medium having an electric conductivity of 500 μS/cm or lower. In this preservation method, the volume average particle diameter of the microcapsules for electrophoretic display devices may preferably be not smaller than 10 μm and not greater than 100 μm. Further, the content of the water-based medium may preferably be 40% or higher. The preservation temperature may preferably be 50° C. or lower.

The present invention further provides, as an application of the above-described preservation method, a sheet for electrophoretic display devices, comprising a layer containing microcapsules for electrophoretic display devices and a binder resin, wherein the microcapsules for electrophoretic display devices have been preserved by a preservation method as described above. In this sheet for electrophoretic display devices, the layer containing microcapsules for electrophoretic display devices and a binder resin may preferably be formed on an electrically conductive film.

The present invention further provides, as applications of the above-described preservation method, an electrophoretic display device comprising a data displaying part, wherein the data displaying part comprises a sheet for electrophoretic display devices as described above, and an electronic equipment comprising a data displaying means, wherein the data displaying means comprises an electrophoretic display device as described above.

According to the present invention, microcapsules for electrophoretic display devices can be preserved over a long period of time without deteriorating their electrophoretic properties. Moreover, since the preserved microcapsules for electrophoretic display devices are not aggregated with one another, excellent sheets for electrophoretic display devices, excellent electrophoretic display devices, and excellent electronic equipments can be obtained. Further, since microcapsules for electrophoretic display devices can be preserved in a state before the microcapsules are made into a coating material, it is made possible to quickly satisfy user's requirements with respect to types of binder resins, types of substrates (transparent electrically conductive films), coating conditions (e.g., coating width, coating length, full face coating, stripe coating), and the like.

DETAILED DESCRIPTION OF THE PREFERRED EMBODIMENTS

Preservation Method of Microcapsules for Electrophoretic Display Devices

The preservation method of microcapsules for electrophoretic display devices according to the present invention (hereinafter sometimes referred to simply as "the preservation method of the present invention") comprises preserving microcapsules for electrophoretic display devices (hereinafter sometimes referred to simply as "microcapsules") in a water-based medium having an electric conductivity of 500 μS/cm or lower.

The phrase "preserving microcapsules for electrophoretic display devices in a water-based medium having an electric conductivity of 500 μS/cm or lower" as used herein means that when preserving microcapsules, the electric conductivity of a water-based medium containing the microcapsules is 500 μS/cm or lower. The electric conductivity of a water-based medium containing microcapsules may preferably be 490 μS/cm or lower, more preferably 480 μS/cm or lower. If the electric conductivity of a water-based medium containing microcapsules is higher than 500 μS/cm, it may be observed that the electrophoretic properties, particularly contrast, are deteriorated when the microcapsules are preserved over a long period of time. The lower limit of the electric conductivity of a water-based medium containing microcapsules is not particularly limited, but it may preferably be 1 μS/cm, more preferably 10 μS/cm, taking into consideration the electric conductivity of pure water or economic efficiency. In this connection, the electric conductivity is defined as a value measured by a conductivity meter (e.g., Conductivity Meter DS-14, available from Horiba, Ltd.)

The microcapsules to which the preservation method of the present invention is to be applied are not particularly limited, but may be any of the heretofore known microcapsules. In particular, there may be preferred microcapsules each enclosing a dispersion containing electrophoretic particles and a solvent in a shell with a double structure composed of an inner shell made of a mercapto group-containing amino resin and an outer shell made of an epoxy resin. The microcapsules and their production process will be described below in detail.

The volume average particle diameter of microcapsules is not particularly limited, but it may preferably be not smaller than 10 μm and not greater than 100 μm, more preferably not smaller than 20 μm and not greater than 90 μm. If the volume average particle diameter of microcapsules is smaller than 10 μm, the electrophoretic particle concentration necessary for display density cannot be ensured, and therefore, sufficient color tone difference (difference of reflectance) cannot be ensured, and accordingly, contrast and the like may be lowered so much as to give no sufficient display performance, or the microcapsules may be aggregated with one another to result in the impossibility of forming a mono-dispersion system of the microcapsules at the time of preparing a coating solution and it may become impossible to obtain an excellent sheet for electrophoretic display devices. To the contrary, if the volume average particle diameter of microcapsules is greater than 100 μm, the electrophoretic properties cannot be exhibited sufficiently and the driving voltage for display may be increased. The volume average particle diameter of microcapsules is defined as a value measured by a laser scattering particle size distribution analyzer (e.g., LA-910, available from Horiba, Ltd.).

When microcapsules are preserved, first, after the preparation of the microcapsules, the microcapsules are sufficiently washed with a water-based medium to remove dissociated ionic substances existing on the surfaces of the microcapsules as much as possible. Then, after the water-based medium containing the washed microcapsules is adjusted to have a prescribed water content, the water-based medium containing the microcapsules is preserved at a prescribed temperature. In this connection, the water-based medium to be used for washing the microcapsules and a water-based medium to be used for preserving the microcapsules may be the same or different.

The preservation temperature may preferably be 50° C. or lower, more preferably 40° C. or lower, and still more preferably 30° C. or lower. If the preservation temperature is higher than 50° C., adverse effects may be caused on the microcapsules and the mechanical strength may possibly be decreased. The lower limit of the preservation temperature is not particularly limited, but there occurs no problem even if it becomes 0° C. or lower in a refrigeration state, and taking into consideration economical efficiency such as energy consumption, it may preferably be −20° C., more preferably −15° C.

The water-based medium to be used for preserving microcapsules is not particularly limited, but there can be used, for example, water or a mixed solvent of water and a hydrophilic organic solvent. When water and a hydrophilic organic solvent are used in combination, the addition amount of water may preferably be from 70% to 95% by mass, more preferably from 75% to 95% by mass, and still more preferably from 80% to 95% by mass.

The hydrophilic organic solvent is not particularly limited, but it may include, for example, alcohols such as methanol, ethanol, n-propyl alcohol, isopropyl alcohol, and allyl alcohol; glycols such as ethylene glycol, propylene glycol, butylene glycol, pentanediol, hexanediol, heptanediol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These hydrophilic organic solvents may be used alone, or two or more of these hydrophilic organic solvents may also be used in combination.

When microcapsules are preserved, as described above, the microcapsules are preserved in the form of a water-based medium containing the microcapsules. In this case, the content of a water-based medium may preferably be 40% or higher, more preferably 45% or higher, and still more preferably 50% or higher. If the content of a water-based medium is lower than 40%, the microcapsules may be aggregated with one another, and at the time of preparing a coating solution, the microcapsules cannot be dispersed to form a mono-dispersion system, and it may possibly result in the impossibility of obtaining an excellent sheet for electrophoretic display devices. The upper limit of the content of a water-based medium is not particularly limited, but taking into consideration preservation efficiency, it may preferably be 90%, more preferably 80%. The content of a water-based medium is defined as a value measured by a method described in Examples.

According to the preservation method of the present invention, microcapsules can be preserved over a long period of time, for example, no shorter than 3 months, without deteriorating their electrophoretic properties.

Microcapsules for Electrophoretic Display Devices

The microcapsules to which the preservation method of the present invention is to be applied may particularly preferably be microcapsules each enclosing a dispersion containing electrophoretic particles and a solvent in a shell with a double structure composed of an inner shell made of a mercapto group-containing amino resin and an outer shell made of an epoxy resin. The following will describe such microcapsules in detail.

Physical Properties of Microcapsules

The microcapsules have flexibility to a certain extent, and since their shape can be changed by outside pressure, the shape is not particularly limited, but it may preferably be particulate, e.g., truly spherical, when there is no outside pressure.

The particle diameter of microcapsules is not particularly limited, but it may preferably be from 5 to 300 μm, more preferably from 10 to 200 μm, and still more preferably from 15 to 150 μm. If the particle diameter of microcapsules is smaller than 5 μm, it may become impossible to obtain sufficient display density in a display part when an electrophoretic display device is produced. To the contrary, if the particle diameter of microcapsules is greater than 300 μm, the strength of the microcapsules may be decreased, and the electrophoretic properties of electrophoretic particles in a dispersion enclosed in the microcapsules cannot sufficiently be exhibited, and accordingly, the driving voltage for display may be increased, when an electrophoretic display device is produced. The particle diameter of microcapsules means their volume average particle diameter as measured by a laser scattering particle size distribution analyzer (e.g., LA-910, available from Horiba, Ltd.).

The variation coefficient (i.e., the narrowness of particle size distribution) of the particle diameter of microcapsules is not particularly limited, but it may preferably be 30% or lower, more preferably 25% or lower, and still more preferably 20% or lower. If the variation coefficient of the particle diameter is higher than 30%, microcapsules having an effective particle diameter may be decreased, and therefore, a great number of microcapsules may have to be used in some cases.

The particle diameter and its variation coefficient of microcapsules are considerably dependent on the particle diameter and particle size distribution of a dispersion obtained by dispersing the microcapsules in a water-based medium when the microcapsules are produced. Therefore, it is made possible to obtain microcapsules having a desired particle diameter and its variation coefficient by appropriately adjusting the dispersing conditions of the dispersion.

Shells of Microcapsules

The microcapsules each enclose a dispersion containing electrophoretic particles and a solvent in a shell with a double layer structure composed of an inner shell and an outer shell. In general, an amino resin forming the inner shell has a high impermeability and an epoxy resin forming the outer shell is excellent in chemical resistance and mechanical properties. Moreover, since the amino resin forming the inner shell and the epoxy resin forming the outer shell are bonded firmly through mercapto groups, capsule strength is improved. Therefore, the microcapsules scarcely cause leakage of the dispersion and are hardly broken by laminate pressure applied when an electrophoretic display device is produced. Accordingly, when an electrophoretic display device is produced, the microcapsules show high contrast and a low leakage current value even if the electrophoretic display device is left over a long period of time under high temperature and high humidity conditions (e.g., at 60° C. and 90% RH for 24 hours).

In the microcapsules as described above, the inner shell is made of an amino resin having mercapto groups. The inner shell can be formed by using a dispersion containing electrophoretic particles and a solvent as a core substance, dispersing the core substance in a water-based medium, and subsequently carrying out a condensation reaction using an initial condensation product obtained by the reaction of at least one compound selected from the group consisting of urea, thiourea, melamine, benzoguanamine, acetoguanamine, and cyclohexylguanamine with formaldehyde in the presence of a compound having a mercapto group(s) and either a carboxyl or sulfo group(s). In this connection, it can be analyzed by a Fourier transform infrared spectroscopy (FTIR) that the amino resin forming the inner shell has mercapto groups.

In the microcapsules as described above, the outer shell is made of an epoxy resin. The outer shell can be formed by adding a compound having an epoxy group(s) after the microcapsules each enclosing the core substance in the inner shell are dispersed in a water-based medium. When the outer shell is formed, it is preferable to cause a reaction of the compound having an epoxy group(s) with a crosslinking agent and/or add an epoxy-melamine condensate product in addition to the compound having an epoxy group(s) since the strength and impermeability of the outer shell are improved, so that the microcapsules are provided with higher performance.

The thickness of the shells of microcapsules (the total thickness of an inner shell and an outer shell) is not particularly limited, but it may preferably be from 0.1 to 5 µm, more preferably from 0.1 to 4 µm, and still more preferably from 0.1 to 3 µm in a swollen state. If the thickness of the shells is thinner than 0.1 µm, it may become impossible to obtain sufficient capsule strength. To the contrary, if the thickness of the shells is thicker than 5 µm, transparency is decreased, so that when an electrophoretic display device is produced, it may result in a contrast decrease; and the flexibility of the microcapsules is decreased, and therefore, when a sheet for electrophoretic display devices is produced, the adhesiveness to an electrode film may become insufficient.

Core Substance of Microcapsules

The microcapsules each enclose a dispersion containing electrophoretic particles and a solvent as a core substance in a shell.

In general, there are, as a method for electrophoretic display, a display method on the basis of a contrast between the color of a solvent and the color of electrophoretic particles in a dispersion, and a display method on the basis of a contrast between the colors of at least two types of electrophoretic particles in a dispersion.

The electrophoretic particles to be used for the dispersion may be solid particles having electrophoretic properties, that is, colored particles showing positive or negative polarity in the dispersion and are not particularly limited, but, for example, pigment particles may be employed. Alternatively, polymer particles colored with dyes or polymer particles containing pigments may also be used. These solid particles may be used alone, or two or more of these solid particles may also be used in combination. In these solid particles, pigment particles may be preferred. In this connection, when solid particles having no electrophoretic properties in the dispersion are used as the electrophoretic particles, the electrophoretic properties are provided by any of the heretofore known methods. Alternatively, solid particles having electrophoretic properties in the dispersion and solid particles having no electrophoretic properties in the dispersion may also be used in combination.

The pigment particles to be used as the electrophoretic particles are not particularly limited, but they may be particles of, as white types, inorganic pigments such as titanium oxide, barium sulfate, zinc oxide, and zinc flower; as yellow types, inorganic pigments such as yellow iron oxide, cadmium yellow, titanium yellow, and chrome yellow, and organic pigments, e.g., insoluble azo compounds such as fast yellow, fused azo compounds such as chromophthal yellow, azo complex salts such as benzimidazolone azo yellow, fused polycyclic compounds such as flavans yellow, hansa yellow, naphthol yellow, nitro compounds, and pigment yellow; as orange types, inorganic pigments such as molybdate orange, and organic pigments, e.g., azo complex salts such as benzimidazolone azo orange and fused polycyclic compounds such as perynone orange; as red types, inorganic pigments such as colcothar and cadmium red, and organic pigments, e.g., dye lakes such as madder lake, soluble azo compounds such as lake red, insoluble azo compounds such as naphthol red, fused azo compounds such as chromophthal scarlet, fused polycyclic compounds such as thioindigo Bordeaux, quinacridone pigments such as Cinquasia red Y and hostarparm red, and azo type pigments such as permanent red and fast slow red; as violet types, inorganic pigments such as manganese violet, and organic pigments, e.g., dye lakes such as Rhodamine lake, and fused polycyclic compounds such as dioxazine violet; as blue types, inorganic pigments such as Prussian blue, ultramarine, cobalt blue, and cerulean blue, and organic pigments, e.g., phthalocyanines such as phthalocyanine blue, indanthrenes such as indanthrene blue, and alkali blue; as green types, inorganic pigments such as emerald green, chrome green, chromium oxide, and viridian, and organic pigments, e.g., azo complex salts such as nickel azo yellow, nitroso compounds such as pigment green, and naphthol green, and phthalocyanines such as phthalocyanine green; as black types, inorganic pigments such as carbon black, titanium black, and iron black, and organic pigments such as aniline black. These pigment particles may be used alone, or two or more of these pigment particles may also be used in combination. In these pigment particles, there may be preferred white type pigment particles such as titanium oxide and black type pigment particles such as carbon black and titanium black.

When fine particles of titanium oxide are used, their type is not particularly limited, and so far as they are widely used as white type pigments, the particles may be either the rutile type or the anatase type, but taking into consideration the color fading of a coloring agent due to the photocatalyst activity of titanium oxide, the rutile type which has lower photocatalyst activity may be preferred, and further, in order to lower the photocatalyst activity, it may be more preferred to use titanium oxide which has been subjected to Si treatment, Al treatment, Si—Al treatment, or Zn—Al treatment.

When polymer particles are used as the electrophoretic particles, their component polymer is not particularly limited, but examples of the polymer may include polyolefin type polymers, poly(halogenated polyolefin) type polymers, polyester type polymers, polyurethane type polymers, polystyrene type polymers, acrylic type polymers, epoxy type polymers, melamine type polymers, and urea type polymers. The term "polymer(s)" as used herein may include homopolymers and copolymers obtained by copolymerization of a monomer(s) with a small amount of a copolymerizable monomer(s). These polymer particles may be used alone, or two or more of these polymer particles may also be used in combination. Dyes for coloring these polymer particles are not particularly limited, but examples of the dyes may include dyes recited below as the dye for coloring a solvent. The pigment to be added to these polymer particles is not particularly limited, but examples of the pigment may include pigments recited above as the pigment to be used for the electrophoretic particles.

The concentration of electrophoretic particles in a dispersion (i.e., percent by mass of the electrophoretic particles, relative to the mass of the dispersion) may preferably be from 5% to 60% by mass, more preferably from 7% to 55% by mass, and still more preferably from 10% to 50% by mass. If the concentration of electrophoretic particles is lower than 5% by mass, no sufficient chromaticity can be obtained, and contrast may be decreased to result in the unclearness of display. To the contrary, if the concentration of electrophoretic particles is higher than 60% by mass, the viscosity of a dispersion may be increased, so that dispersion treatment may become difficult, and the electrophoretic particles may be aggregated in a part to which voltage is applied for display, and it may lead to a decrease of contrast and a decrease of response speed (display responsiveness) of the electrophoretic particles.

The particle diameter of electrophoretic particles is not particularly limited, but it may preferably be from 0.1 to 5 µm, more preferably from 0.1 to 4 µm, and still more preferably from 0.1 to 3 µm. If the particle diameter of electrophoretic particle is smaller than 0.1 µm, no sufficient chromaticity can be obtained, and when the electrophoretic particles are used for an electrophoretic display device, contrast may be decreased to result in the unclearness of display. To the contrary, if the particle diameter of electrophoretic particles is greater than 5 µm, it is needed to heighten the coloration degree of the electrophoretic particles themselves beyond necessity, and accordingly, the use amount of pigments may be increased, and when the electrophoretic particles are used for an electrophoretic display device, it may become difficult for the electrophoretic particles to rapidly move in a part to which voltage is applied for display, so that their response speed (display responsiveness) may be decreased. The particle diameter of electrophoretic particles means their volume average particle diameter measured by a dynamic light scattering nanoparticle size analyzer (e.g., LB-550, available from Horiba, Ltd.).

The electrophoretic particles may be dispersed as they are in a solvent, but after the surfaces of electrophoretic particles are treated by the reaction with a coupling agent, or by polymer grafting treatment, or by coating with a polymer, the electrophoretic particles may be dispersed in a solvent. When the surface treatment is carried out, the electrophoretic particles may preferably be pigment particles surface-treated with a coupling agent or a polymer. In the present invention, surface-treated electrophoretic particles may be referred simply to as electrophoretic particles.

The solvent to be used for the dispersion is not particularly limited, but may be any of the solvent which have heretofore been widely used for a dispersion for electrophoretic display devices, and more specifically, there may be used those which are substantially insoluble in water (hydrophobic) and cause no interaction with the shells of microcapsules to an extent that the functions of the microcapsules are not inhibited, and for example, highly insulating organic solvents may be preferred.

Examples of the highly insulating organic solvents may include aromatic hydrocarbons, e.g. benzene type hydrocarbons such as benzene, toluene, o-xylene, m-xylene, p-xylene, mixed xylene, ethylbenzene, hexylbenzene, dodecylbenzene, and phenylxylylethane; aliphatic hydrocarbons, e.g. paraffin type hydrocarbons such as n-hexane and n-decane, isoparaffin type hydrocarbons such as Isopar (available from Exxon Kagaku K.K.), olefin type hydrocarbons such as 1-octene and 1-decene, and naphthene type hydrocarbons such as cyclohexane and decalin; petroleum- and coal-derived hydrocarbon mixtures such as kerosene, petroleum ethers, petroleum benzin, ligroin, industrial gasoline, coal tar naphtha, petroleum naphtha, and solvent naphtha; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicone oils such as dimethylsilicone oil and methylphenylsilicone oil; and fluorine type solvents such as hydrofluoro ethers. These organic solvents may be used alone, or two or more of these organic solvents may also be used in combination. In these organic solvents, long-chain alkylbenzenes such as hexylbenzene and dodecylbenzene, phenylxylylethane, Isoper (available from Exxon Kagaku K.K.), and dimethylsilicone oil may be preferred since they have high boiling points and high ignition points and have almost no toxicity.

When a solvent is colored, it may be preferred to carry out colorization to an extent that sufficient contrast can be obtained to the color of electrophoretic particles (e.g., to white in the case of fine particles of titanium oxide).

When a solvent is colored, a dye to be used for the colorization is not particularly limited, but oil-soluble dyes may be preferred, and particularly in terms of usability, azo dyes and anthraquinone dyes may be preferred. Specific examples of the dye may include, as yellow type dyes, azo compounds such as OIL YELLOW 3G (available from Orient Chemical Industries, Ltd.); as orange type dyes, azo compounds such as FAST ORANGE G (available from BASF AG); as blue type dyes, anthraquinones such as MACROLEX BLUE RR (available from BAYER AG); as green type dyes, anthraquinones such as SUMIPLAST GREEN G (available from Sumitomo Chemical Co., Ltd.); as brown type dyes, azo compounds such as OIL BROWN GR (available from Orient Chemical Industries, Ltd.); as red type dyes, azo compounds such as OIL RED 5303 (available from Arimoto Chemical Co., Ltd.) and OIL RED SB (available from Orient Chemical Industries, Ltd.); as violet type dyes, anthraquinones such as OIL VIOLET #730 (available from Orient Chemical Industries, Ltd.); and as black type dyes, azo compounds such as SUDAN BLACK X60 (available from BASF AG) and mixtures of anthraquinone type MACROLEX BLUE FR (available from BAYER AG) and azo type OIL RED XO (available from Kanto Chemical Co., Inc.). These dyes may be used alone, or two or more of these dyes may also be used in combination.

The dispersion may contain, if necessary, a dye(s), a dispersant(s), an electric charge controlling agent(s), a viscosity modifier(s), and the like, besides electrophoretic particles and a solvent. Their addition amounts are not particularly limited, but may appropriately be adjusted to an extent that they neither affect the electrophoretic particles nor inhibit the functions of the electrophoretic particles.

Production Process of Microcapsules for Electrophoretic Display Devices

The process for producing the above microcapsules each enclosing a dispersion containing electrophoretic particles and a solvent in a shell with a double layer structure composed of an inner shell made of a mercapto group-containing amino resin and an outer shell made of an epoxy resin comprises forming the inner shell made of a mercapto group-containing amino resin on the surface of a core substance by using a dispersion containing electrophoretic particles and a solvent as the core substance, dispersing the core substance in a water-based medium, and then carrying out a condensation reaction using an initial condensation product obtained by the reaction of at least one compound selected from the group consisting of urea, thiourea, melamine, benzoguanamine, acetoguanamine, and cyclohexylguanamine with formaldehyde in the presence of a compound having a mercapto group(s) and either a carboxyl or sulfo group(s); and subsequently forming the outer shell made of an epoxy resin on the outer surface of the inner shell by dispersing the microcapsules each enclosing the core substance in the inner shell in a water-based medium and then adding an epoxy group-containing compound thereto. The following will describe this production process in detail along the respective steps.

Dispersing of Core Substance

First, using a dispersion containing electrophoretic particles and a solvent as a core substance, the core substance is dispersed in a water-based medium. The water-based medium is not particularly limited, but there can be used, for example, water or a mixed solvent of water with a hydrophilic organic solvent. When water and a hydrophilic organic solvent are used in combination, the addition amount of water may preferably be from 70% to 95% by mass, more preferably from 75% to 95% by mass, and still more preferably from 80% to 95% by mass.

The hydrophilic organic solvent is not particularly limited, but examples of the hydrophilic organic solvent may include alcohols such as methanol, ethanol, n-propyl alcohol, isopropyl alcohol, and allyl alcohol; glycols such as ethylene glycol, propylene glycol, butylene glycol, hexylene glycol, pentanediol, hexanediol, heptanediol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These hydrophilic organic solvents may be used alone, or two or more of these hydrophilic organic solvents may also be used in combination.

The water-based medium may be used in combination with another solvent besides water and a hydrophilic organic solvent. Examples of another solvent may include hexane, cyclopentane, pentane, isopentane, octane, benzene, toluene, xylene, ethylbenzene, aminylsqualene, petroleum ethers, terpene, castor oil, soybean oil, paraffin, and kerosene. When another solvent is used in combination, its use amount may preferably be 30% by mass or lower, more preferably 25% by mass or lower, and still more preferably 20% by mass or lower, relative to the water-based medium containing water and a hydrophilic organic solvent.

The amount of the core substance to be dispersed in a water-based medium is not particularly limited, but it may preferably be from 5 to 70 parts by mass, more preferably from 8 to 65 parts by mass, and still more preferably from 10 to 60 parts by mass, relative to 100 parts by mass of the water-based medium. If the amount for dispersion is lower than 5 parts by mass, the concentration of the core substance is low, so that it may take a long time to form capsule shells, and it may become impossible to produce desired microcapsules, and the microcapsules may have a wide particle size distribution to decrease production efficiency. To the contrary, if the amount for dispersion is higher than 70 parts by mass, the core substance is aggregated and the water-based medium is suspended in the core substance to make it impossible to produce microcapsules.

When the core substance is dispersed in a water-based medium, a dispersant may be used, if necessary. The dispersant is not particularly limited, but examples of the dispersant may include water-soluble polymers (e.g., polyvinyl alcohol (PVA), carboxymethyl cellulose (CMC), gelatin, and gum arabic) and surfactants (e.g., anionic surfactants, cationic surfactants, amphoteric surfactants, and nonionic surfactants). These dispersants may be used alone, or two or more of these dispersants may also be used in combination. The addition amount of these dispersants is not particularly limited, so long as it does not inhibit inner shell formation, and it may appropriately be adjusted.

Preparation of Initial Condensation Product

Then, the initial condensation product is prepared by causing a reaction of at least one compound selected from the group consisting of urea, thiourea, melamine, benzoguanamine, acetoguanamine, and cyclohexylguanamine (hereinafter sometimes referred to as the "amino compound") with formaldehyde.

The initial condensation product obtained by the reaction of the amino compound and formaldehyde is a compound to be a precursor of an "amino resin" (i.e., urea resin, melamine resin, or guanamine resin). Using the specific initial condensation product, the inner shell made of an amino resin can be formed, and mercapto groups can be introduced into the amino resin produced from the initial condensation product by causing the reaction in the presence of a compound having a mercapto group(s) and either a carboxy or sulfo group(s).

With respect to the initial condensation product, (1) when at least one of urea and thiourea (hereinafter sometimes referred to as the "urea compound") is reacted with formaldehyde, there can be obtained an initial condensation product giving a urea resin; (2) when melamine is reacted with formaldehyde, there can be obtained an initial condensation product giving a melamine resin; and (3) when at least one of benzoguanamine, acetoguanamine, and cyclohexylguanamine (hereinafter sometimes referred to as the "guanamine compound") is reacted with formaldehyde, there can be obtained an initial condensation product giving a guanamine resin. Moreover, (4) when at least two of the urea compound, melamine, and the guanamine compound are reacted with formaldehyde, there can be obtained an initial condensation product giving a resin containing at least two types of urea resin, melamine resin, and guanamine resin. These initial condensation products (1) to (4) may be used alone, or two or more of these initial condensation products (1) to (4) may also be used in combination.

In general, the reaction of the amino compound and formaldehyde is carried out using water as a solvent. Therefore, the reaction may be carried out, for example, by a method of mixing the amino compound with an aqueous formaldehyde solution and carrying out the reaction, or by a method of preparing an aqueous formaldehyde solution by the addition of water to trioxane or p-formaldehyde, mixing the amino compound with the aqueous formaldehyde solution thus obtained, and carrying out the reaction. From economical points of view, e.g., in terms of no need to prepare an aqueous formaldehyde solution and the availability of an aqueous formaldehyde solution, there may be preferred a method of mixing the amino compound with an aqueous formaldehyde solution and carrying out the reaction. Moreover, when the amino compound is mixed with an aqueous formaldehyde solution, both of adding the amino compound to the aqueous formaldehyde solution and adding the aqueous formaldehyde solution to the amino compound may be possible. The condensation reaction may preferably be carried out under stirring using any of the heretofore known stirring apparatuses.

The amino compound may preferably be urea, melamine, and benzoguanamine, more preferably melamine, a combination of melamine and urea, and a combination of melamine and benzoguanamine.

As the amino compound, another amino compound may be used, besides the above amino compound. Examples of another amino compound may include capriguanamine, amerine, ameride, ethylene urea, propylene urea, and acetylene urea. When another amino compound is used, amino compounds including another amino compound are used as starting materials for the initial condensation product.

With respect to the reaction for obtaining an initial condensation product, the addition amounts of the amino compound and formaldehyde are not particularly limited, but they may preferably be, by the mole ratio of amino compound/formaldehyde, from 1/0.5 to 1/10, more preferably from 1/1 to 1/8, and still more preferably from 1/1 to 1/6. If the mole ratio of amino compound/formaldehyde is lower than 1/10, the amount of unreacted formaldehyde may be increased, and therefore, the reaction efficiency may be decreased. To the contrary, if the mole ratio of amino compound/formaldehyde is higher than 1/0.5, the amount of unreacted amino compound may be increased, and therefore, the reaction efficiency may be decreased. In this connection, if water is used as the solvent for the reaction, the addition amounts of the amino compound and formaldehyde, relative to the solvent, that is, the concentrations of the amino compound and formaldehyde at the time of feed are more desirable to be higher, so long as there is no obstacle in the reaction.

The reaction temperature for carrying out the reaction for obtaining an initial condensation product is not particularly limited, but it may preferably be from 55° C. to 85° C., more preferably from 60° C. to 80° C., and still more preferably from 65° C. to 75° C., and when the end point of the reaction is confirmed, the reaction may be finished by an operation such as cooling of a reaction solution to normal temperature (e.g., from 25° C. to 30° C.). Thus, the reaction solution containing an initial condensation product can be obtained. The reaction time is not particularly limited, but it may appropriately be set in accordance with feed amounts.

Formation of Inner Shell

Then, a condensation reaction is carried out using an initial condensation product in a water-based medium containing a core substance dispersed therein in the presence of a compound having a mercapto group(s) (—SH) and either a carboxyl group(s) (—COOH) or a sulfo group(s) (—SO$_3$H) (hereinafter sometimes referred to as the "thiol compound") to form an inner shell made of a mercapto group-containing amino resin on the surface of the core substance. This operation gives microcapsules each enclosing a dispersion containing electrophoretic particles and a solvent in an inner shell made of a mercapto group-containing amino resin.

The addition amount of an initial condensation product is not particularly limited, but it may preferably be from 0.5 to 10 parts by mass, more preferably from 0.5 to 5 parts by mass, and still more preferably from 0.5 to 3 parts by mass, relative to 1 part by mass of a core substance. The thickness of an inner shell can easily be controlled by adjusting the addition amount of an initial condensation product. If the addition amount of an initial condensation product is lower than 0.5 parts by mass, it may become impossible to form a sufficient amount of an inner shell or the thickness of an inner shell may be narrowed, so that the strength and impermeability of the inner shell may be lowered. To the contrary, if the addition amount of an initial condensation product is higher than 10 parts by mass, the thickness of an inner shell may become thick, so that the flexibility and transparency of the inner shell may be lowered.

A method of adding an initial condensation product to a water-based medium is not particularly limited, but either of collective addition or successive addition (continuous addition and/or intermittent addition) may be employed. The addition of an initial condensation product may be preferred to be carried out under stirring using any of the heretofore known stirring apparatuses.

The thiol compound to be used in the condensation reaction is not particularly limited, but examples of the thiol compound may include cysteine (2-amino-3-mercaptopropionic acid), mercaptoacetic acid, mercaptopropionic acid, mercaptobenzoic acid, mercaptosuccinic acid, mercaptoethanesulfonic acid, mercaptopropanesulfonic acid, their alkali metal salts, their alkaline earth metal salts, and their ammonium salts. These thiol compounds may be used alone, or two or more of these thiol compounds may also be used in combination. In these thiol compounds, L-cysteine may be preferred from an economical point of view, e.g., in terms of availability.

The addition amount of the thiol compound is not particularly limited, but it may preferably be from 1 to 20 parts by mass, more preferably from 1 to 10 parts by mass, and still more preferably from 1 to 5 parts by mass, relative to 100 parts by mass of an initial condensation product. If the addition amount of the thiol compound is lower than 1 part by mass, since the amount of mercapto group to be introduced into the amino resin may be low, firm bonds with an epoxy resin forming an outer shell cannot be formed in some cases. To the contrary, if the addition amount of the thiol compound is higher than 20 parts by mass, the strength and impermeability of an inner shell may be lowered.

A method of adding the thiol compound to a water-based medium is not particularly limited, but it may be preferred to be carried out by adding the initial condensation product to the water-based medium containing a core substance dispersed therein, sufficiently stirring the mixture thus obtained, and then dropwise adding the thiol compound in form of an aqueous solution. The condensation reaction may be preferred to be carried out under stirring using any of the heretofore known stirring apparatuses.

In the production process of the present invention, an inner shell is formed on the surface of a core substance by carrying out the condensation reaction of an initial condensation product in the presence of the thiol compound in a water-based medium containing the core substance dispersed therein. Specifically, while the amino group of the initial condensation product and the carboxyl or sulfo group of the thiol compound are reacted with each other, the condensation reaction of the initial condensation product is carried out to deposit a mercapto group-containing amino resin on the surface of a core substance to form an inner shell.

The reaction temperature for carrying out the condensation reaction is not particularly limited, but it may preferably be from 25° C. to 80° C., more preferably from 30° C. to 70° C., and still more preferably from 35° C. to 60° C. The reaction time is not particularly limited, but it may appropriately be set in accordance with feed amounts.

After the condensation reaction is carried out, an aging period may be provided. The temperature for the aging is not particularly limited, but it may preferably be a temperature equal to or slightly higher than the reaction temperature for carrying out the condensation reaction. The aging period is not particularly limited, but it may preferably be from 0.5 to 5 hours, more preferably from 1 to 3 hours.

After an inner shell is formed, the microcapsules thus obtained may be separated from the water-based medium by any of the heretofore known methods, for example, suction filtration and spontaneous filtration, if necessary, but since an amino resin forming the inner shell is very fragile and may possibly be broken or damaged by weak impact or pressure, it may be preferred to subject the microcapsules to the next process without separating the microcapsules from the water-based medium.

Classifying and Washing of Microcapsules

The microcapsules obtained at the step of forming an inner shell may be preferred to be classified to obtain microcapsules in a narrow particle size distribution and/or may be preferred to be washed to remove impurities to improve product quality.

The classification of microcapsules may be carried out in such a manner that the microcapsules have a desired particle diameter or particle size distribution by any of the heretofore known methods, for example, sieving, filtration, centrifugal precipitation, or spontaneous precipitation of a dispersion containing the microcapsules in a water-based medium as it is or after dilution with an arbitrary water-based medium. In this connection, for microcapsules having a relatively great particle diameter, a sieving method is effective.

The washing of microcapsules may be carried out by repeating the following operations: precipitating the microcapsules by any of the heretofore known methods, for example, centrifugal precipitation or spontaneous precipitation of a dispersion containing the microcapsules in a water-based medium as it is or after dilution with an arbitrary water-based medium; discarding the supernatant solution; recovering the precipitate; and again dispersing the precipitate in an arbitrary water-based medium. For microcapsules having a relatively great particle diameter, it may be preferred to employ spontaneous precipitation in order to avoid the breakage or damage of the microcapsules.

Formation of Outer Shell

Then, after microcapsules each enclosing a core substance in an inner shell are dispersed in a water-based medium, an epoxy group-containing compound (hereinafter sometimes referred to as the "epoxy compound") is added, and an outer shell made of an epoxy resin is formed on the outer surface of the inner shell. This operation gives microcapsules each enclosing a dispersion containing electrophoretic particles and a solvent in a shell composed of an inner shell made of a mercapto group-containing amino resin and an outer shell made of an epoxy resin.

The water-based medium for dispersing microcapsules each enclosing a core substance in an inner shell may include water-based mediums recited above as the water-based medium for dispersing the core substance when the inner shell is formed. Since microcapsules each enclosing a core substance in an inner shell can be obtained in the form of a dispersion of the microcapsules in the water-based medium, the microcapsules may be subjected, without being separated or dispersed again in a water-based medium, to the step of forming an outer shell in the form of a dispersion of the microcapsules in the water-based medium as it is or after concentration or dilution.

The epoxy compound is not particularly limited, but there may be preferred water-soluble epoxy compounds having two or more epoxy groups in one molecule, of which examples may include sorbitol polyglycidyl ether, sorbitan polyglycidyl ether, polyglycerol polyglycidyl ether, pentaerythritol polyglycidyl ether, triglycidyltris(2-hydroxyethyl) isocyanurate, trimethylolpropane polyglycidyl ether, neopentyl glycol diglycidyl ether, polyethylene glycol diglycidyl ether, polypropylene glycol diglycidyl ether, and adipic acid diglycidyl ether. These epoxy compounds may be used alone, or two or more of these epoxy compounds may also be used in combination.

The mass average molecular weight of the epoxy compound may preferably be from 300 to 100,000, more preferably from 300 to 75,000, and still more preferably from 300 to 50,000. If the mass average molecular weight of the epoxy compound is lower than 300, it may become impossible to obtain an outer shell having sufficient strength. To the contrary, if the mass average molecular weight of the epoxy compound is higher than 100,000, the viscosity of the reaction system may be increased to make stirring difficult.

The addition amount of the epoxy compound is not particularly limited, but it may preferably be from 0.5 to 10 parts by mass, more preferably from 0.5 to 5 parts by mass, and still more preferably from 0.5 to 3 parts by mass, relative to 1 part by mass of a core substance. The thickness of an outer shell can easily be controlled by adjusting the addition amount of the epoxy compound. If the addition amount of the epoxy compound is lower than 0.5 parts by mass, it may become impossible to form a sufficient amount of an outer shell, or the thickness of an outer shell may be narrowed, so that the strength of the outer shell may be lowered. To the contrary, if the addition amount of the epoxy compound is greater than 10 parts by mass, the thickness of an outer shell may become thick, so that the flexibility and transparency of the outer shell may be lowered.

A method of adding the epoxy compound to a water-based medium is not particularly limited, but both of collective addition or successive addition (continuous addition and/or intermittent addition) may be employed. The addition of an initial condensation product may be preferred to be carried out under stirring using any of the heretofore known stirring apparatuses after microcapsules each enclosing a core substance in an inner shall are dispersed in the water-based medium.

When an outer shell made of an epoxy resin is formed, a reaction of the epoxy compound with a crosslinking agent may be carried out. A reaction of the epoxy compound with a crosslinking agent can improve the strength of an outer shell and therefore the strength of shells, so that the breakage or damage of the shells can effectively be suppressed when microcapsules are thereafter separated or washed.

The crosslinking agent is not particularly limited, but examples of the crosslinking agent may include sodium diethyldithiocarbamate (including its hydrate), diethylammonium diethyldithiocarbamate (including its hydrate), dithiooxalic acid, and dithiocarbonic acid. These crosslinking agents may be used alone, or two or more of these crosslinking agents may also be used in combination.

The addition amount of a crosslinking agent is not particularly limited, but it may preferably be from 1 to 100 parts by mass, more preferably from 5 to 90 parts by mass, and still more preferably from 10 to 80 parts by mass, relative to 100 parts by mass of the epoxy compound. If the addition amount of a crosslinking agent is lower than 1 part by mass, it may become impossible to sufficiently improve the strength of an outer shell. To the contrary, if the addition amount of a crosslinking agent is higher than 100 parts by mass, since the crosslinking agent may react on the epoxy group of the epoxy compound to an excess extent, the flexibility of an outer shell may be decreased.

A method of adding a crosslinking agent to a water-based medium may be a method of adding a crosslinking agent together with the epoxy compound or a method of adding a crosslinking agent before or after the addition of the epoxy compound, and is not particularly limited, but it may be preferred to dropwise add a crosslinking agent in the form of an aqueous solution under stirring after a while from the addition of the epoxy compound in the form of an aqueous solution to a water-based medium in which microcapsules each enclosing a core substance in an inner shell are dispersed.

When an outer shell made of an epoxy resin is formed, an epoxy-melamine condensation product may be added in addition to the epoxy compound. The addition of an epoxy-melamine condensation product can improve the impermeability of an outer shell and therefore the impermeability of shells, so that microcapsules can be provided with higher performance.

The epoxy-melamine condensation product may be an initial condensation product produced from the epoxy compound, melamine, and formaldehyde by any of the heretofore known methods, and is not particularly limited, but it can further be reacted with at least one compound selected from the group consisting of urea, thiourea, benzoguanamine, acetoguanamine, and cyclohexylguanamine. Preferred examples of the epoxy-melamine condensation product may include a condensation product produced by the reaction of a compound, which is obtained by the reaction of the epoxy compound with urea, with an initial condensation product, which is obtained by the reaction of melamine, urea, and formaldehyde.

The addition amount of an epoxy-melamine condensation product is not particularly limited, but it may preferably be from 0 to 10 parts by mass, more preferably from 0 to 8 parts by mass, and still more preferably from 0 to 5 parts by mass, relative to 1 part by mass of the epoxy compound. If the addition amount of an epoxy-melamine condensation product is greater than 10 parts by mass, an outer shell may become fragile, so that the strength of the outer shell may be decreased.

A method of adding an epoxy-melamine condensation product to a water-based medium may be carried out, together with the addition of the epoxy compound, or before or after the addition of the epoxy compound, and is not particularly limited, but it may be preferred to add an epoxy-melamine condensation product in the form of an aqueous solution after a while from the addition of the epoxy compound in the form of an aqueous solution to a water-based medium in which microcapsules each enclosing a core substance in an inner shell are dispersed. When the reaction of a crosslinking agent is carried out, it may be preferred to dropwise add the crosslinking agent in the form of an aqueous solution after a while from the addition of an epoxy-melamine condensation product in the form of an aqueous solution.

The temperature for forming an outer shell is not particularly limited, but it may preferably be from 25° C. to 80° C., more preferably from 30° C. to 70° C., and still more preferably from 35° C. to 60° C. The time for forming an outer shell is not particularly limited, but it may appropriately be set in accordance with feed amounts.

After an outer shell is formed, an aging period may be provided. The temperature for the aging is not particularly limited, but it may preferably be a temperature equal to or slightly higher than the temperature for forming an outer shell. The aging period is not particularly limited, but it may preferably be from 0.5 to 5 hours, more preferably from 1 to 3 hours.

After an outer shell is formed, the microcapsules thus obtained may be separated from the water-based medium by any of the heretofore known methods, for example, suction filtration and spontaneous filtration, if necessary, but since the solvent of a core substance may leak and be evaporated, if the microcapsules are kept in a dry state, and it results in the deformation of the microcapsules, it may be preferred to subject the microcapsules to the next process without separating the microcapsules from the water-based medium.

The microcapsules obtained at the step of forming an outer shell may be preferred to be classified to obtain microcapsules in a narrow particle size distribution and/or may be preferred to be washed to remove impurities to improve product quality.

The classification and washing of microcapsules can be carried out in the same manner for microcapsules obtained at the step of forming an inner shell, and therefore, their explanation is omitted herein.

Sheet for Electrophoretic Display Devices

The sheet for electrophoretic display devices according to the present invention is characterized in that the sheet is obtained from microcapsules for electrophoretic display devices, which have been preserved by the preservation method of the present invention. In general, the sheet for electrophoretic display devices comprises a layer containing microcapsules for electrophoretic display devices and a binder resin. In this sheet, the layer containing microcapsules for electrophoretic display devices and a binder resin may preferably be formed on an electrically conductive film. Therefore, the sheet for electrophoretic display devices according to the present invention may be constructed in the same manner as any of the heretofore known sheets for electrophoretic display devices, except that there is formed a layer containing microcapsules for electrophoretic display devices, which have been preserved by the preservation method of the present invention, and a binder resin. In other words, the sheet for electrophoretic display devices according to the present invention can be obtained by replacing the microcapsules for electrophoretic display devices to be used for any of the heretofore known sheets for electrophoretic display devices with the microcapsules for electrophoretic display devices, which have been preserved by the preservation method of the present invention. In this connection, the binder resin may be any of the binder resins to be used for any of the heretofore known sheets for electrophoretic display devices, and is, therefore, not particularly limited.

Electrophoretic Display Device

The sheet for electrophoretic display devices according to the present invention can be used, for example, as the constituent member of a data displaying part, for electrophoretic display devices. The electrophoretic display device of the present invention is an electrophoretic display device comprising a data display part, wherein the data displaying part comprises a sheet for electrophoretic display devices as described above. The electrophoretic display device of the present invention is the same as any of the heretofore known electrophoretic display devices, except that the data displaying part comprises the sheet for electrophoretic display devices according to the present invention. For this reason, parts other than the data displaying part, for example, a driving circuit and an electric power supply circuit, may be constructed in the same manner as in the heretofore known electrophoretic display devices. In other words, the electrophoretic display device of the present invention can be obtained by constructing the data displaying part in any of the heretofore known electrophoretic display devices with the sheet for electrophoretic display devices according to the present invention. In the present invention, the data displaying part alone may be referred to as an electrophoretic display device by incorporating a driving circuit and an electric power supply circuit into an external circuit.

Electronic Equipments

The electronic display device of the present invention can be used, for example, as a data displaying means, for electronic equipments. The electronic equipment of the present invention is an electronic equipment comprising a data displaying means, wherein the data displaying means comprises the electrophoretic display device of the present invention. The term "data displaying means" as used herein refers to a means for displaying character data or image data. The electronic equipment of the present invention is the same as any of the heretofore known electronic equipments, except that the data displaying means comprises the electrophoretic display device of the present invention. For this reason, parts other than the data displaying means may be constructed in the same manner as in the heretofore known electronic equipments. In other words, the electronic equipment of the present invention can be obtained by replacing the data displaying means in any of the heretofore known electronic equipments with the electronic display device of the present invention.

The electronic equipments to which the electronic display device of the present invention can be applied are not particularly limited, so long as each of the electronic equipments comprises a data displaying means. Examples of the electronic equipments may include personal computers, workstations, word processors, IC cards, IC tags, electronic notepads, electronic dictionnary, IC recorders, electronic books, electronic papers, electronic notebooks, electric desktop calculators, electronic newspapers, electronic white boards, direction boards, advertisement boards, various displays, TV sets, DVD players, digital still cameras, view finder-type or monitor direct view-type video cameras, car navigation systems, mobile phones, videophones, pagers, mobile terminals, POS terminals, and various equipments having touch panels. These electronic equipments have heretofore been known, from which the electronic equipment of the present invention can be obtained by replacing the data displaying means with the electrophoretic display device of the present invention.

EXAMPLES

The present invention will be explained below in detail by reference to Examples, but the present invention is not limited to these Examples. The present invention can be put into practice after appropriate modifications or variations within a range meeting the gists described above and later, all of which are included in the technical scope of the present invention.

First, the following will describe a method of measuring the volume average particle diameter of microcapsules, a method of evaluating the preservation stability of microcapsules, a production method of electrophoretic display devices, a method of measuring contrast, a method of measuring electric conductivity, and a method of measuring the content of a water-based medium (hereinafter sometimes referred to as the "water content").

Measurement of Volume Average Particle Diameter

The volume average particle diameter of microcapsules was measured using a laser scattering particle size distribution analyzer (LA-910, available from Horiba, Ltd.).

Evaluation of Preservation Stability

Microcapsules were preserved in the form of a microcapsules synthesized dispersion, a microcapsules paste or filtration cake, a microcapsules coating solution, or a microcapsules-coated sheet under the prescribed environments, and electrophoretic display devices were produced and their contrast was measured on the first day and every 20 days thereafter to evaluate the preservation stability of the microcapsules on the basis of contrast changes.

Production Method of Electrophoretic Display Devices

An electrophoretic display device was produced by attaching a microcapsules-coated sheet (a sheet for electrophoretic display devices) with a coated part having a height of 5 cm and a width of 3 cm on a PET film with ITO having a height of 6 cm, a width of 4 cm, and a thickness of 75 μm (a counter electrode; Highbeam CH-22, available from Toray Industries, Inc.) (by fixing them at arbitrary two points with Cellotape (registered trademark)) in a state that an un-coated part (a conductive part) was left in one side, setting the attached sheet and film on a glass plate having a thickness of 2 mm, and laminating the sheet and film on the glass plate by passing them between two rolls.

The rolls were silicone rubber rolls having a roll diameter of 3 inch (about 7.62 cm), and the upper roll was heated by a heat medium to have the roll surface temperature of 120° C., rotated with a driving motor, and pressurized to the lower roll by air pressure of 0.2 mPa·s to keep 0 mm gap between the rolls. The lower roll was not heated and was rotated freely, and the roll position was fixed. The rolls were rotated at a feeding speed of 6 cm/min., and while the laminate face was set in the heated roll side, the attached sample was set on the glass plate and passed between the rolls.

Measurement of Contrast

A direct current voltage of 40 V was applied between both electrodes of an electrophoretic display device for 0.4 seconds to carry out white display or black display, and the reflection density of each display was measured with a Macbeth spectroscopic densitometer (trade name: SpectroEye, available from GretagMacbeth), and the reflectance of white display or black display was calculated according to the following equation:

$$\text{Reflectance} = 100/10^{reflection\ density}$$

The contrast (reflectance ratio) was calculated from the calculated reflectance according to the following equation:

$$\text{Contrast} = \text{reflectance of white display}/\text{reflectance of black display}$$

Measurement of Electric Conductivity

The electric conductivity of a water-based medium containing microcapsules was measured using a conductivity meter (trade name: Conductivity Meter DS-14, available from Horiba, Ltd.)

Measurement of Water Content

About 3 g of a microcapsule sample was accurately measured, and the sample was dried in a hot air dryer at 90° C. for 1 hour and cooled, and then, the mass after drying was measured so as to calculate the water content from the amount of mass decrease according to the following equation:

$$\text{Water content (\%)} = [(\text{mass before drying} - \text{mass after drying})/\text{mass before drying}] \times 100$$

Then, the following will describe the preparation of electrophoretic particles and a dispersion for electrophoretic display devices, and the preparation of microcapsules for electrophoretic display devices.

Synthesis Example 1

A 100-mL round-bottomed separable flask was charged with 7.5 g of melamine, 7.5 g of urea, 30 g of a 37% aqueous formaldehyde solution, and 3 g of 25% ammonia water, and the mixture was heated to 70° C. under stirring. After the mixture was kept at the same temperature for 1.5 hours, the mixture was cooled to 30° C. to obtain an aqueous solution (A-1) with a solid content of 54.4% containing a melamine-urea-formaldehyde initial condensation product.

Synthesis Example 2

A 300-mL separable flask equipped with stirring blades, a thermometer, and a condenser tube was charged with 2 g of an acrylic polymer (having a mass average molecular weight of 3,300) made of dodecyl methacrylate, 2-ethylhexyl acrylate, and glycidyl methacrylate (their composition ratio being 80:15:5), 20 g of carbon black (MA-100 R, available from Mitsubishi Chemical Corporation), and 78 g of Isoper M (available from Exxon Kagaku K.K.), and further charged with 800 g of zirconia beads having a diameter of 1 mm.

While the mixture was stirred at a rotation speed of 300 rpm, a polymer grafting treatment was carried out by causing a reaction at 160° C. for 2 hours. After the treatment, further 100 g of Isoper M (available from Exxon Kagaku K.K.) was added, and the mixture was sufficiently mixed. After that, the zirconia beads were separated to obtain a dispersion of carbon black subjected to the polymer grafting treatment (the epoxy groups of the acrylic polymer were reacted here with the carboxyl groups existing on the surface of the carbon black).

On the other hand, a 300-mL separable flask equipped with stirring blades was charged with 50 g of titanium oxide (Tipaque CR 90, available from Ishihara Sangyo Kaisha, Ltd.), 5 g of an acrylic polymer (having a mass average molecular weight of 6,800) made of dodecyl methacrylate, 2-ethylhexyl acrylate, and methacryloxy-propyltrimethoxysilane (their composition ratio being 80:15:5), and 100 g of hexane, and the flask was put in an ultrasonic bath (BRANSON 5210, available from Yamato Kagaku Co., Ltd.) at 55° C., followed by ultrasonic dispersion treatment under stirring for 2 hours.

This separable flask was transferred to a hot water bath at 90° C., and the solvent was removed. The titanium oxide which became in a powder state was taken out of the flask, transferred to a tray, and then heat treated in a dryer at 150° C. for 5 hours. The titanium oxide thus heat treated was dispersed in 100 g of hexane, and separated by centrifugation using a centrifugal separator, followed by washing. After this operation was repeated three times, the titanium oxide was dried at 100° C.

A 300-mL separable flask equipped with stirring blades was charged with 50 g of the titanium oxide thus washing treated and 50 g of Isoper M (available from Exxon Kagaku K.K.), and the flask was put in an ultrasonic bath (BRANSON 5210, available from Yamato Kagaku Co., Ltd.) at 55° C., followed by ultrasonic dispersion treatment under stirring for 2 hours, to obtain a dispersion of titanium oxide subjected to the polymer grafting treatment(the silyl groups of the acrylic polymer were reacted here with the hydroxy groups existing on the surface of the titanium oxide).

A 200-mL mayonnaise bottle was charged with 6.0 g of the above dispersion of carbon black subjected to the polymer grafting treatment, 75 g of the above dispersion of titanium oxide subjected to the polymer grafting treatment, and 19 g of Isoper M (available from Exxon Kagaku K.K.), and the mixture was sufficiently mixed to obtain a dispersion for electrophoretic display devices.

Synthesis Example 3

A 500-mL flat-bottomed separable flask was charged with 120 g of an aqueous solution containing 20 g of gum arabic dissolved therein, and 100 g of the dispersion for electrophoretic display devices was added, while being stirred at 600 rpm using a disper (ROBOMICS, available from Tokushu Kika Kogyo Co., Ltd.). After that, the stirring speed was changed to 1,600 rpm, followed by stirring for 2 minutes, and the stirring speed was changed to 1,000 rpm, and 100 g of water was added to obtain a suspension.

The suspension was placed in a 300-mL four-necked separable flask equipped with a thermometer and a condenser tube, and while being kept at 40° C. and stirred by paddle blades, 48 g of the aqueous solution (A-1) was added. After 15 minutes, 100 g of an aqueous solution containing 2 g of L-cysteine dissolved therein was added dropwise by a dropping funnel over 5 minutes. While being kept at 40° C., the reaction was carried out for 4 hours, and the temperature was then increased to 50° C., and aging was carried out for 2 hours to obtain a dispersion of microcapsules each enclosing the dispersion for electrophoretic display devices in the inner shell made of a mercapto group-containing amino resin.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottomed separable flask and heated to 40° C. under stirring.

To the microcapsule dispersion was added 100 g of an aqueous solution containing 15 g of polyglycerol polyglycidyl ether (Denacol EX-521 (having a mass average molecular weight of 732 and a solubility in water of 10%), available from Nagase Chemtex Corporation), as an epoxy compound, dissolved therein. After 30 minutes, 50 g of an aqueous solution containing 2 g of sodium diethyldithiocarbamate dissolved therein was added dropwise by a dropping funnel over 5 minutes. While being kept at 40° C., the reaction was carried out for 3 hours, and the temperature was then increased to 50° C., and aging was carried out for 1 hour to obtain a dispersion of microcapsules enclosing the dispersion for electrophoretic display devices in a shell composed of an inner shell made of a mercapto group-containing amino resin and an outer shell made of an epoxy resin on the outer surface of the inner shell.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The volume average particle diameter of the microcapsules was measured, and it was found to be 50.6 μm.

Synthesis Example 4

Microcapsules were prepared in the same manner as described in Synthesis Example 3, except that the stirring speed by a disper was changed to 2,500 rpm from 1,600 rpm to obtain a suspension and a standard sieve having meshes of 53 μm was used in place of the standard sieve having meshes of 75 μm.

The volume average particle diameter of the microcapsules was measured, and it was found to be 21.6 μm.

Synthesis Example 5

Microcapsules were prepared in the same manner as described in Synthesis Example 3, except that the stirring speed by a disper was changed to 1,300 rpm from 1,600 rpm to obtain a suspension and a standard sieve having meshes of 106 μm was used in place of the standard sieve having meshes of 75 μm.

The volume average particle diameter of the microcapsules was measured, and it was found to be 87.1 μm.

The following will describe the preservation stability of various microcapsules prepared in Synthesis Examples 3 to 5 when preserved in various forms under various environments.

Example 1

The microcapsules of Synthesis Example 3 were suction-filtered, and 100 g of the filter cake thus obtained was put in a 300-mL container made of polypropylene, to which 12 g of deionized water was added, and the mixture was sufficiently stirred to obtain a microcapsule paste.

The water content and electric conductivity of the microcapsule paste were measured. The results are shown in Table 1.

The above container was tightly closed and stored in a constant temperature and constant humidity room at a temperature of 25° C. and relative humidity of 60%, and the following operation was carried out on the first day and every 20 days thereafter, and an electrophoretic display device was produced to measure contrast on each day. The results are shown in Table 1.

First, about 15 g of the microcapsule paste was put on a filter paper to obtain a dewatered cake. The water content of the dewatered cake was about 63%. A coating solution was obtained by adding 2 g of a resin solution with a solid content of 50%, in which an alkali-soluble acrylic resin (AR951, available from Nippon Shokubai Co., Ltd.) was dissolved in ammonia, to 8 g of the dewatered cake, and mixing the mixture by a hybrid defoaming mixer (Awatori Rentaro AR-100, available from THINKY Corporation) for 10 minutes.

Then, the coating solution was applied to a PET film with ITO (Highbeam CH-22, available from Toray Industries, Inc.) by an applicator, and dried in a hot air drier at 90° C. for 10 minutes to obtain a sheet for electrophoretic display devices.

Using the sheet for electrophoretic display devices, an electrophoretic display device was produced by the above-described method, and contrast was measured.

Example 2

The microcapsules of Synthesis Example 4 were suction-filtered, and 200 g of the filter cake thus obtained was put in a 500-mL container made of polypropylene, to which 116 g of deionized water was added, and the mixture was sufficiently stirred to obtain a microcapsule paste.

The water content and electric conductivity of the microcapsule paste were measured. The results are shown in Table 1.

The above container was tightly closed and stored in a constant temperature and constant humidity room at a temperature of 50° C. and relative humidity of 60%, and the following operation was carried out on the first day and every 20 days thereafter, and an electrophoretic display device was produced to measure contrast on each day. The results are shown in Table 1.

First, about 31 g of the microcapsule paste was put on a filter paper to obtain a dewatered cake. The water content of the dewatered cake was about 60%. A coating solution was obtained by adding 2 g of a resin solution with a solid content of 50%, in which an alkali-soluble acrylic resin (AR951, available from Nippon Shokubai Co., Ltd.) was dissolved in ammonia, to 8 g of the dewatered cake, and mixing the mixture by a hybrid defoaming mixer (Awatori Rentaro AR-100, available from THINKY Corporation) for 10 minutes.

Then, the coating solution was applied to a PET film with ITO (Highbeam CH-22, available from Toray Industries, Inc.) by an applicator, and dried in a hot air drier at 90° C. for 10 minutes to obtain a sheet for electrophoretic display devices.

Using the sheet for electrophoretic display devices, an electrophoretic display device was produced by the above-described method, and contrast was measured.

Example 3

The microcapsules of Synthesis Example 5 were suction-filtered, and 100 g of the filter cake thus obtained was put in a 300-mL container made of polypropylene, to which 134 g of deionized water was added, and the mixture was sufficiently stirred to obtain a microcapsule paste.

The water content and electric conductivity of the microcapsule paste were measured. The results are shown in Table 1.

The above container was tightly closed and stored in a refrigerator at −15° C., and the following operation was carried out on the first day and every 20 days thereafter, and an electrophoretic display device was produced to measure contrast on each day. The results are shown in Table 1. The container was tightly closed again and stored in a refrigerator at −15° C.

First, the container was taken out of the refrigerator and thawed, and about 15 g of the microcapsule paste was put on a filter paper to obtain a dewatered cake. The water content of the dewatered cake was about 68%. A coating solution was obtained by adding 2 g of a resin solution with a solid content of 50%, in which an alkali-soluble acrylic resin (AR951, available from Nippon Shokubai Co., Ltd.) was dissolved in ammonia, to 8 g of the dewatered cake, and mixing the mixture by a hybrid defoaming mixer (Awatori Rentaro AR-100, available from THINKY Corporation) for 10 minutes.

Then, the coating solution was applied to a PET film with ITO (Highbeam CH-22, available from Toray Industries, Inc.) by an applicator, and dried in a hot air drier at 90° C. for 10 minutes to obtain a sheet for electrophoretic display devices.

Using the sheet for electrophoretic display devices, an electrophoretic display device was produced by the above-described method, and contrast was measured.

Comparative Example 1

In Synthesis Example 3, the dispersion of the microcapsules for electrophoretic display devices was filtered with a standard sieve having meshes of 75 µm to remove coarse capsules, and no washing step was then carried out to obtain a synthesized dispersion of the microcapsules for electrophoretic display devices for comparison. The water content and electric conductivity of the synthesized dispersion of the microcapsules for electrophoretic display devices for comparison were measured. The results are shown in Table 1.

After 450 g of the synthesized dispersion of the microcapsules for electrophoretic display devices for comparison was put in a 500-mL container made of polypropylene, which was tightly closed and stored in a constant temperature and constant humidity room at a temperature of 25° C. and relative humidity of 60%, and an electrophoretic display device was produced in the same manner as described in Example 1 on the first day and every 20 days thereafter to measure contrast on each day. The results are shown in Table 1.

Comparative Example 2

In Synthesis Example 3, the dispersion of the microcapsules for electrophoretic display devices was filtered with a standard sieve having meshes of 75 μm to remove coarse capsules, and then washed three times to obtain a dispersion of the microcapsules for electrophoretic display devices. The electric conductivity of the dispersion of the microcapsules for electrophoretic display devices was measured, and it was found to be 188 μS/cm.

The dispersion of the microcapsules for electrophoretic display devices was suction-filtered. The water content of the filtered cake thus obtained was 35%. Then, 100 g of the filtered cake was put in a 300-mL container made of polypropylene, which was tightly closed and stored in a constant temperature and constant humidity room at a temperature of 25° C. and relative humidity of 60%, and an electrophoretic display device was produced in the same manner as described in Example 1 on the first day and every 20 days thereafter to measure contrast on each day. The results are shown in Table 1.

Comparative Example 3

A coating solution for comparison was produced by adding 9.1 g of a resin solution with a solid content of 50%, in which an alkali-soluble acrylic resin (AR951, available from Nippon Shokubai Co., Ltd.) was dissolved in ammonia, to 35 g of the dewatered cake of Comparative Example 2, and mixing the mixture by a hybrid defoaming mixer (Awatori Rentaro AR-100, available from THINKY Corporation) for 10 minutes.

The water content and electric conductivity of the coating solution for comparison were measured. The results are shown in Table 1.

Then, 100 g of the coating solution for comparison was put in a 300-mL container made of polypropylene, which was tightly closed and stored in a constant temperature and constant humidity room at a temperature of 25° C. and relative humidity of 60%, and an electrophoretic display device was produced in the same manner as described in Example 1 on the first day and every 20 days thereafter to measure contrast on each day. The results are shown in Table 1.

Comparative Example 4

A sheet for electrophoretic display devices was obtained by applying the coating solution for comparison of Comparative Example 3 to a PET film with ITO (Highbeam CH-22, available from Toray Industries, Inc.) by an applicator, and then drying in a hot air dryer at 90° C. for 10 minutes.

The sheet was stored in a constant temperature and constant humidity room at a temperature of 25° C. and relative humidity of 60%, and an electrophoretic display device was produced in the same manner as described above on the first day and every 20 days thereafter to measure contrast on each day. The results are shown in Table 1.

Comparative Example 5

A dispersion of the microcapsule for electrophoretic display devices for comparison was obtained in the same manner as described in Synthesis Example 3, except that the washing step was carried out one time in place of three times after coarse capsules were removed by filtering the dispersion of the microcapsules for electrophoretic display devices with a standard sieve having meshes of 75 μm.

The dispersion of the microcapsule for electrophoretic display devices for comparison was suction-filtered, and 100 g of the filtered cake thus obtained was put in a 300-mL container made of polypropylene, to which 32.7 g of deionized water was added, and the mixture was sufficiently stirred to obtain a microcapsule paste for comparison.

The water content and electric conductivity of the microcapsule paste for comparison were measured. The results are shown in Table 1.

The above container was tightly closed and stored in a constant temperature and constant humidity room at a temperature of 25° C. and relative humidity of 60%, and an electrophoretic display device was produced in the same manner as described Example 1 on the first day and every 20 days thereafter to measure contrast on each day. The results are shown in Table 1.

TABLE 1

| | Volume average particle diameter (μm) | Preservation state, water content (%) | Electric conductivity (μS/cm) | Preservation environments Temp. (° C.) | Preservation environments Humidity (% RH) | Contrasts of electrophoretic display devices On the 1st day | Contrasts of electrophoretic display devices After 20 days | Contrasts of electrophoretic display devices After 40 days | Contrasts of electrophoretic display devices After 60 days |
|---|---|---|---|---|---|---|---|---|---|
| Example 1 | 50.6 | paste 42 | 176 | 25 | 60 | 7.8 | 7.7 | 7.8 | 7.8 |
| Example 2 | 21.6 | paste 62 | 482 | 50 | 60 | 8.1 | 8.0 | 7.9 | 7.8 |
| Example 3 | 87.1 | paste 50 | 280 | −15 | — | 7.1 | 7.2 | 7.1 | 7.1 |
| Comp. Ex. 1 | 50.6 | synthesized dispersion 87 | 1,175 | 25 | 60 | 7.6 | 5.1 | 4.4 | 3.8 |
| Comp. Ex. 2 | 50.6 | filtered cake 35 | — | 25 | 60 | 7.8 | 6.6 | 5.7 | 4.9 |
| Comp. Ex. 3 | 50.6 | coating solution 51 | 4,520 | 25 | 60 | 7.7 | 7.4 | 6.4 | 5.1 |
| Comp. Ex. 4 | 50.6 | sheet — | — | 25 | 60 | 7.8 | 7.7 | 7.5 | 7.0 |
| Comp. Ex. 5 | 50.6 | Paste 51 | 626 | 25 | 60 | 7.8 | 7.1 | 6.5 | 6.0 |

As can be seen from Table 1, since the microcapsules for electrophoretic display devices in Examples 1 to 3 were preserved in the form of a paste satisfying the condition that they were in a water-based medium having an electric conductivity of 500 μS/cm or lower, even after a lapse of 60 days, the microcapsules showed extremely high preservation stability with no substantial decrease in the contrasts of the electrophoretic display devices.

On the other hand, since the microcapsules for electrophoretic display devices in Comparative Examples 1, 3, and 5 were preserved in the form of a synthesized dispersion, a coating solution, and a paste, all not satisfying the condition that they were in a water-based medium having an electric conductivity of 500 μS/cm or lower, the contrasts of the electrophoretic display devices were sharply decreased after a lapse of 20 days to 60 days, showing very poor preservation stability. Moreover, since the microcapsules for electrophoretic display devices in Comparative Example 2 were preserved in the form of a filtered cake of which electric conductivity could not be measured, the contrasts of the electrophoretic display devices were sharply decreased after a lapse of 20 days to 60 days, showing very poor preservation stability. Further, since the microcapsules for electrophoretic display devices in Comparative Example 4 were preserved in the form of a sheet of which electric conductivity could not be measured, the contrasts of the electrophoretic display devices were gradually decreased after a lapse of 20 days to 60 days, showing low preservation stability.

Thus, it can be understood that if the microcapsules for electrophoretic display devices are preserved in a water-based medium having an electric conductivity of 500 μS/cm or lower, the microcapsules can be preserved over a long period of time without deteriorating their electrophoretic properties.

The preservation method of the present invention makes it possible to perverse microcapsules for electrophoretic display devices over a long period of time without deteriorating their electrophoretic properties. Therefore, the preservation method of the present invention makes it possible to provide sheets for electrophoretic display devices and electrophoretic display devices having excellent display quality, according to the user's demand, from the preserved microcapsules for electrophoretic display devices. Accordingly, the preservation method of the present invention makes a great contribution in various fields related to electronic equipments using electrophoretic display devices.

Example 4

Figure 1:
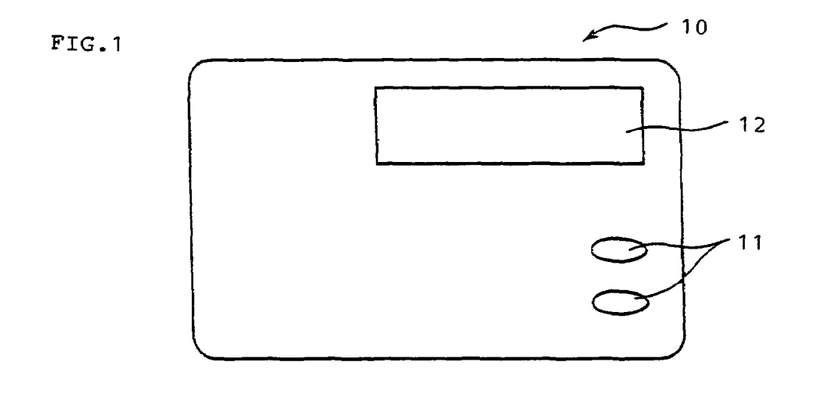
FIG. 1 is a plan view showing one example of an IC card which is one embodiment of the electronic equipment of the present invention.

FIG. 1 is a plan view showing one example of an IC card which is one embodiment of the electronic equipment of the present invention. IC card 10 has two operation buttons 11 and 11, and display panel 12. In the IC card 10, display panel 12 as a data displaying means is the electrophoretic display device of the present invention.

Example 5

Figure 2:
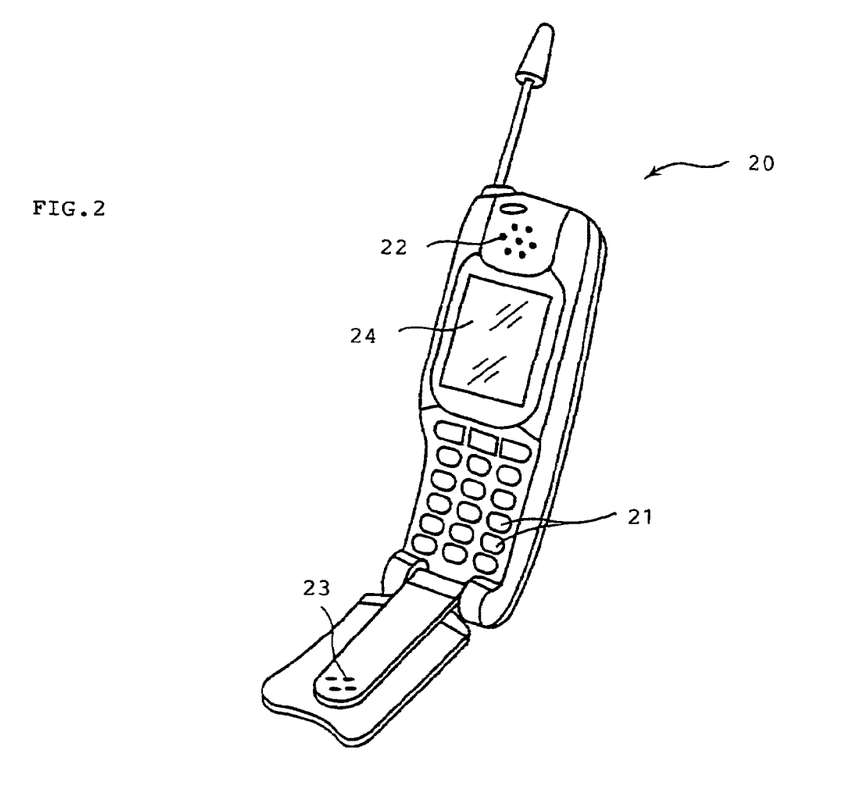
FIG. 2 is a perspective view showing one example of a mobile phone which is another embodiment of the electronic equipment of the present invention.

FIG. 2 is a perspective view showing one example of a mobile phone which is another embodiment of the electronic equipment of the present invention. Mobile phone 20 has two or more buttons 21, 21, . . . , and 21, earpiece 22, mouthpiece 23, and display panel 24. In the mobile phone 20, display panel 24 as a data displaying means is the electrophoretic display device of the present invention.

Example 6

Figure 3:
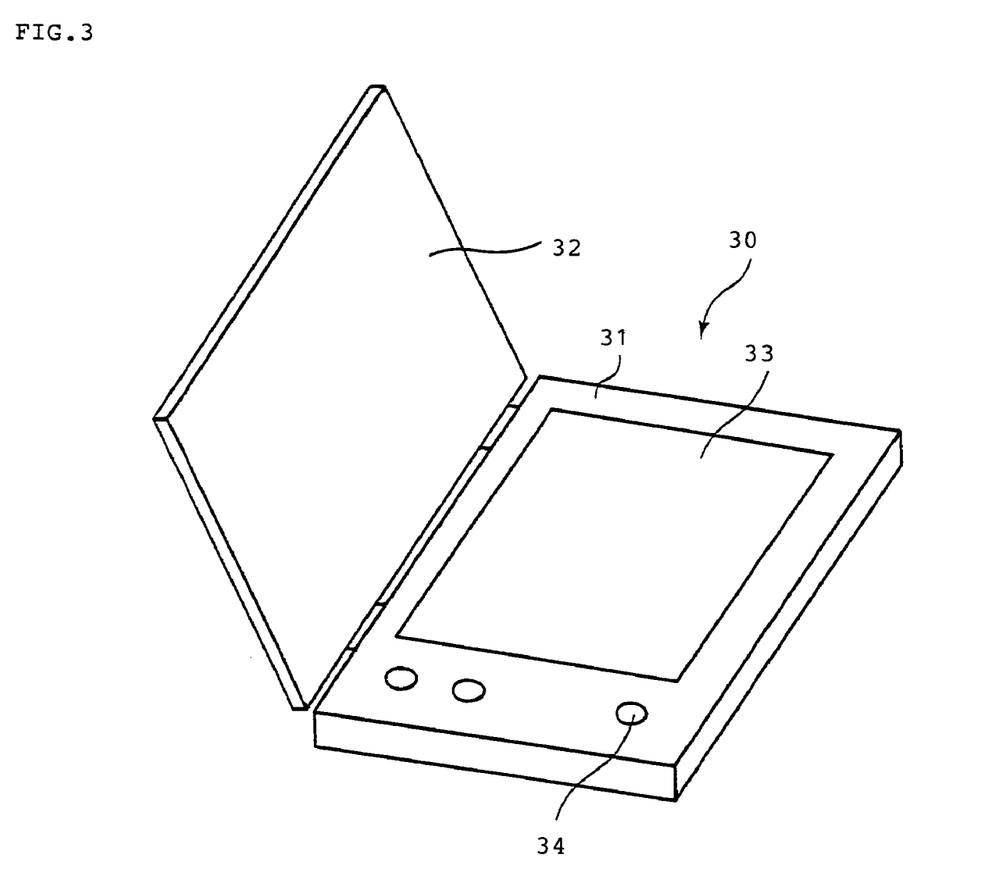
FIG. 3 is a perspective view showing one example of an electronic book which is still another embodiment of the electronic equipment of the present invention.

FIG. 3 is a perspective view showing one example of an electronic book which is still another embodiment of the electronic equipment of the present invention. Electronic book 30 has a book-shaped frame 31, and cover 32 which is provided rotatably relative to the frame 31 (openable and closable). Frame 31 has display device 33 in the state where the display surface is opened, and operating portion 34. In the electronic book 30, display device 33 as a data displaying means is the electrophoretic display device of the present invention.

Example 7

Figure 4:
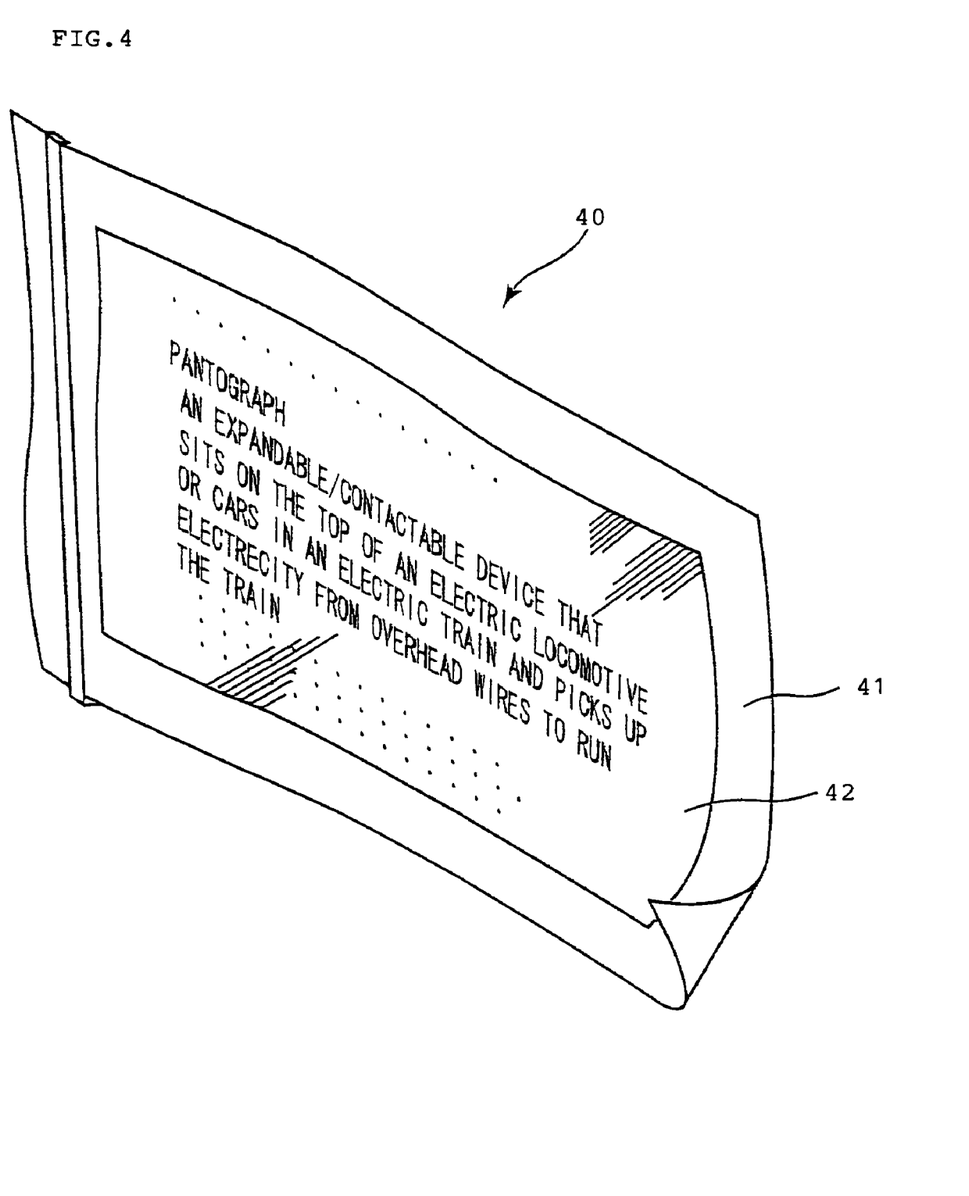
FIG. 4 is a perspective view showing one example of an electronic paper which is still another embodiment of the electronic equipment of the present invention.

FIG. 4 is a perspective view showing one example of an electronic paper which is still another embodiment of the electronic equipment of the present invention. Electronic paper 40 has body 41 formed of a re-writable sheet having the same texture and flexibility as those of a paper, and display unit 42. In the electronic paper 40, display unit 42 as a data displaying means is the electrophoretic display device of the present invention.

Each of the IC card of Example 4, the mobile phone of Example 5, the electronic book of Example 6, and the electronic paper of Example 7 includes the electrophoretic display device of the present invention as the data displaying means, so that they are electronic equipments having extremely excellent display properties such as display responsiveness and contrast.

The invention claimed is:

1. A method of preserving microcapsules for electrophoretic display devices, comprising washing the microcapsules with a water-based medium, and then combining the microcapsules with a water-based medium, wherein the water-based medium combined with the micro-capsules has an electric conductivity of 500 μS/cm or lower and has a temperature of 50° C. or lower.

2. The preservation method according to claim 1, wherein a volume average particle diameter of the microcapsules for electrophoretic display devices is not smaller than 10 μm and not greater than 100 μm.

3. The preservation method according to claim 1, wherein a content of the water-based medium is 40% or higher.

4. A sheet for electrophoretic display devices, comprising a layer containing microcapsules for electrophoretic display devices and a binder resin, wherein the microcapsules for electrophoretic display devices have been preserved by a preservation method according to claim 1.

5. The sheet for electrophoretic display devices according to claim 4, wherein the layer containing microcapsules for electrophoretic display devices and the binder resin is formed on an electrically conductive film.

6. An electrophoretic display device comprising a data displaying part, wherein the data displaying part comprises a sheet for electrophoretic display devices according to claim 4.

7. An electronic equipment comprising a data displaying means, wherein the data displaying means comprises an electrophoretic display device according to claim 6.

* * * * *